United States Patent [19]

Kataumi et al.

[11] Patent Number: 5,575,175
[45] Date of Patent: Nov. 19, 1996

[54] SHIFT LEVER ASSEMBLY

[75] Inventors: Yoshimasa Kataumi; Yasuyuki Ikegami, both of Kosai, Japan

[73] Assignee: Fuji Kiko Co., Ltd., Tokyo, Japan

[21] Appl. No.: 512,760

[22] Filed: Aug. 9, 1995

[30] Foreign Application Priority Data

Sep. 30, 1994 [JP] Japan .................. 6-236118

[51] Int. Cl.$^6$ .............. F16H 63/38; F16B 21/00
[52] U.S. Cl. ................. 74/475; 74/538; 403/327
[58] Field of Search ............ 74/475, 538; 403/327, 403/377, 378

[56] References Cited

U.S. PATENT DOCUMENTS

| | | | |
|---|---|---|---|
| 3,468,568 | 9/1969 | Ulich | 403/377 X |
| 4,365,522 | 12/1982 | Kubota et al. | 74/475 |
| 4,566,349 | 1/1986 | van der Loon et al. | 74/475 |
| 4,884,668 | 12/1989 | Kobayashi et al. | 192/4 A |
| 4,909,096 | 3/1990 | Kobayashi | 74/538 |
| 5,186,069 | 2/1993 | Asano et al. | 74/477 |
| 5,187,999 | 2/1993 | Kobayashi et al. | 74/528 |
| 5,207,740 | 5/1993 | Ikushima et al. | 192/4 A |
| 5,257,964 | 11/1993 | Petters | 403/377 X |
| 5,497,673 | 3/1996 | Kataumi et al. | 74/538 |

FOREIGN PATENT DOCUMENTS

| | | |
|---|---|---|
| 5-13826 | 2/1993 | Japan . |
| 5-86063 | 11/1993 | Japan . |
| 6-32152 | 4/1994 | Japan . |

*Primary Examiner*—Allan D. Herrmann
*Attorney, Agent, or Firm*—Foley & Lardner

[57] ABSTRACT

A shift lever assembly including a detent rod with a lateral detent pin. The detent rod has one end and a lateral through bore receiving the lateral detent pin. A hollow pivotable shift lever receives the detent rod for its movement in a longitudinal direction of the shift lever. A compression spring has one end bearing against the one end of the detent rod and operative to apply force to the detent rod. The detent pin is formed with a groove positioned in the lateral through bore. The detent rod is formed with a passage having one end opening at the one end of the detent rod and the opposite end opening to the lateral through bore. A lock bolt is slidably received in the passage. The lock bolt has one end connected to the compression spring at the one end thereof and an opposite end engaged in the groove of the lateral detent pin.

9 Claims, 6 Drawing Sheets

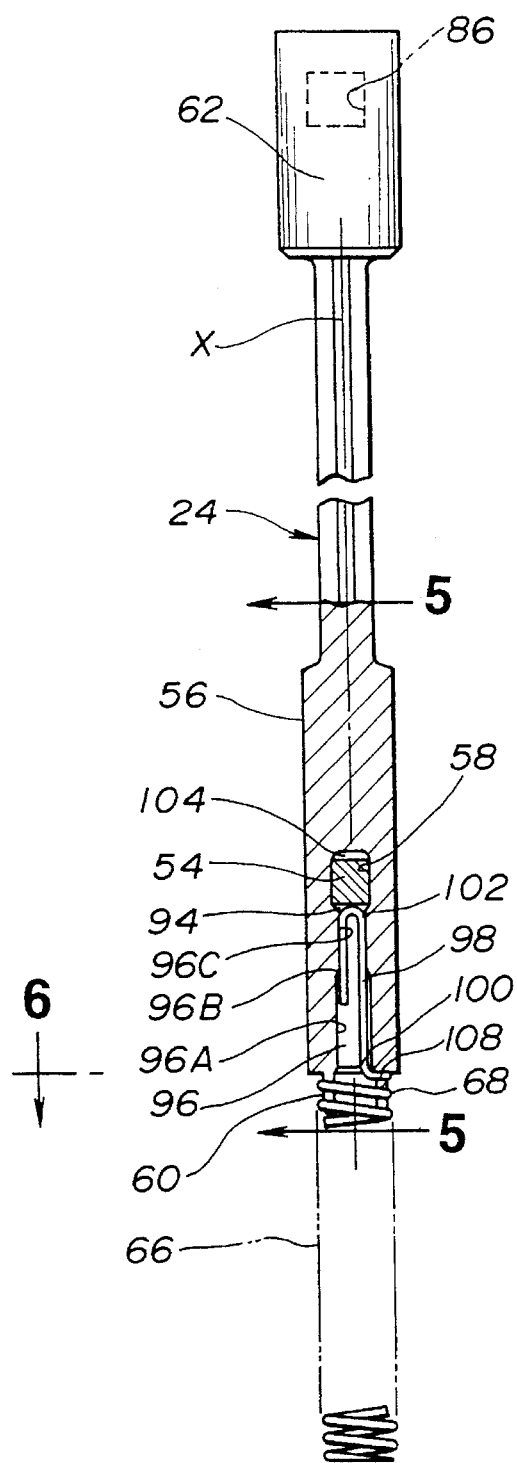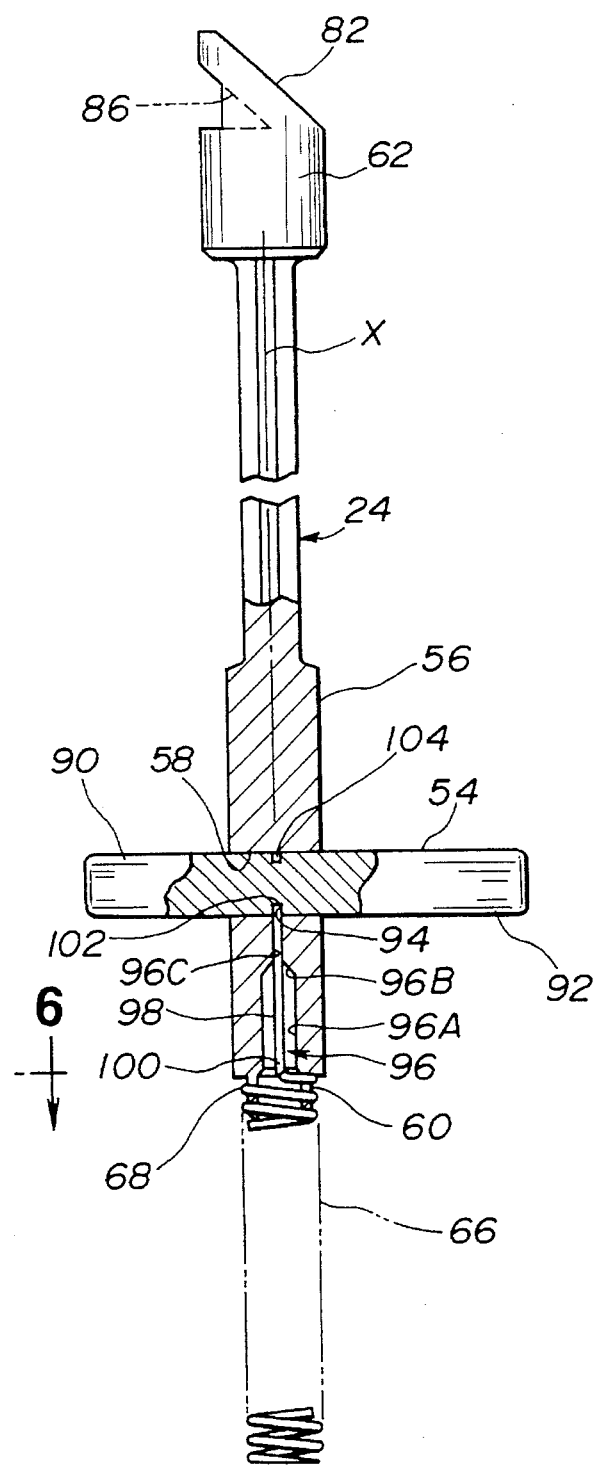

SHIFT LEVER ASSEMBLY

BACKGROUND OF THE INVENTION

The present invention relates to a shift lever assembly for automatic transmissions.

Japanese Utility Model Application First Publication No. 6-32152 discloses a shift lever assembly which includes a detent rod with a lateral detent pin and a pivotal shift lever receiving the detent rod. The lateral detent pin is received in a lateral through bore formed in one end of the detent rod which is made of resin material. The detent pin has a groove engaged with a projection which is formed in the lateral through bore of the detent rod. The detent rod is formed with a hole near the projection so as to allow resilient deformation of the projection for its engagement in the groove of the detent pin. The detent pin is held on the detent rod by the engagement of the projection in the groove.

Japanese Utility Model Application First Publication No. 5-86063 discloses a shift lever assembly which includes a detent rod made of synthetic resin and a metal pipe mounted in the detent rod by insert molding. The metal pipe is formed with a projection extending inwardly from its inner surface. A lateral detent pin is press-fitted into the metal pipe and retained on the detent rod by engagement with the projection of the metal pipe.

Japanese Utility Model Application First Publication No. 5-13826 discloses a shift lever assembly for automatic transmission which includes a detent rod with a lateral detent pin and a pivotable shift lever receiving the detent rod. The detent pin is received in a lateral through bore formed in the detent rod. The detent pin is prevented from a movement in a lateral direction relative to the detent rod by abutting at its axial end against a wall member of a housing which is opposed to on end of the detent pin. Alternatively, the detent pin is prevented from the lateral movement by engagement of a shoulder portion of the detent pin with the detent rod.

SUMMARY OF THE INVENTION

An object of the present invention is to provide an improved shift lever assembly which is assembled simply and easily and capable of surely supporting a detent pin on a detent rod.

According to the present invention, there is provided a shift lever assembly, comprising:

a detent rod with a lateral detent pin, the detent rod having one end and a lateral through bore receiving the lateral detent pin;

a pivotable shift lever which is hollowed to receive the detent rod for movement in a longitudinal direction of the shift lever; and a compression spring having one end bearing against the one end of the detent rod and operative to apply force to the detent rod;

wherein the detent pin is formed with a groove positioned in the lateral through bore, the detent rod being formed with a passage having one end opening at the one end of the detent rod and the opposite end opening to the lateral through bore, and a lock bolt is slidably received in the passage, the lock bolt having one end connected to the compression spring at the one end thereof and an opposite end engaged in the groove of the lateral detent pin.

BRIEF DESCRIPTION OF THE DRAWINGS

FIG. 4 is a side view, partially in section taken along the line 4—4 of FIG. 2, of a detent rod with a lateral detent pin of the shift lever assembly;

FIG. 5 is a front view, partially in section taken along the line 5—5 of FIG. 4, of the detent rod with the lateral detent pin;

DESCRIPTION OF THE PREFERRED EMBODIMENT

Figure 1:
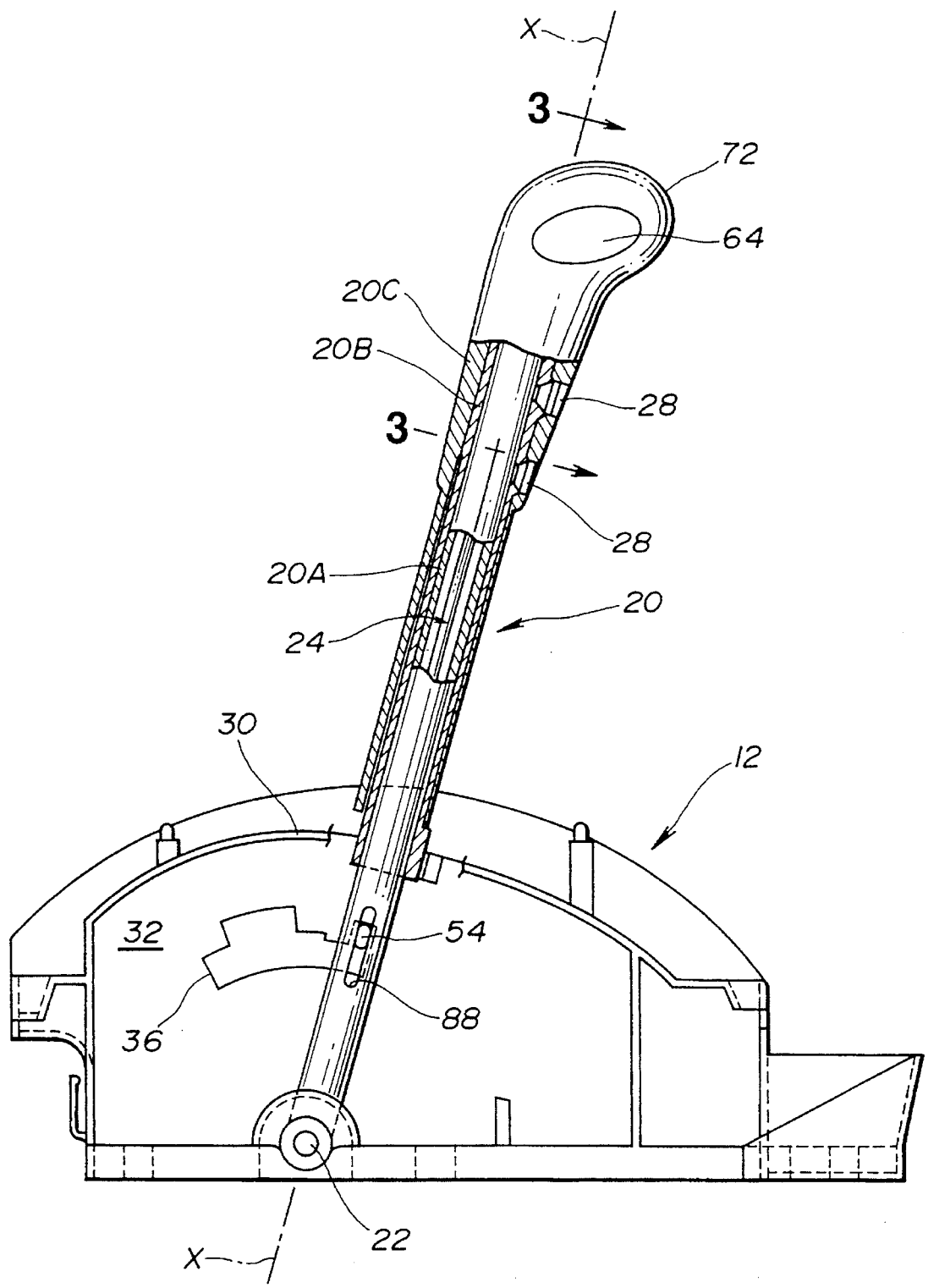
FIG. 1 is a side view of a first embodiment of a shift lever assembly according to the present invention, partially in section taken in a longitudinal direction of a shift lever.
Figure 2:
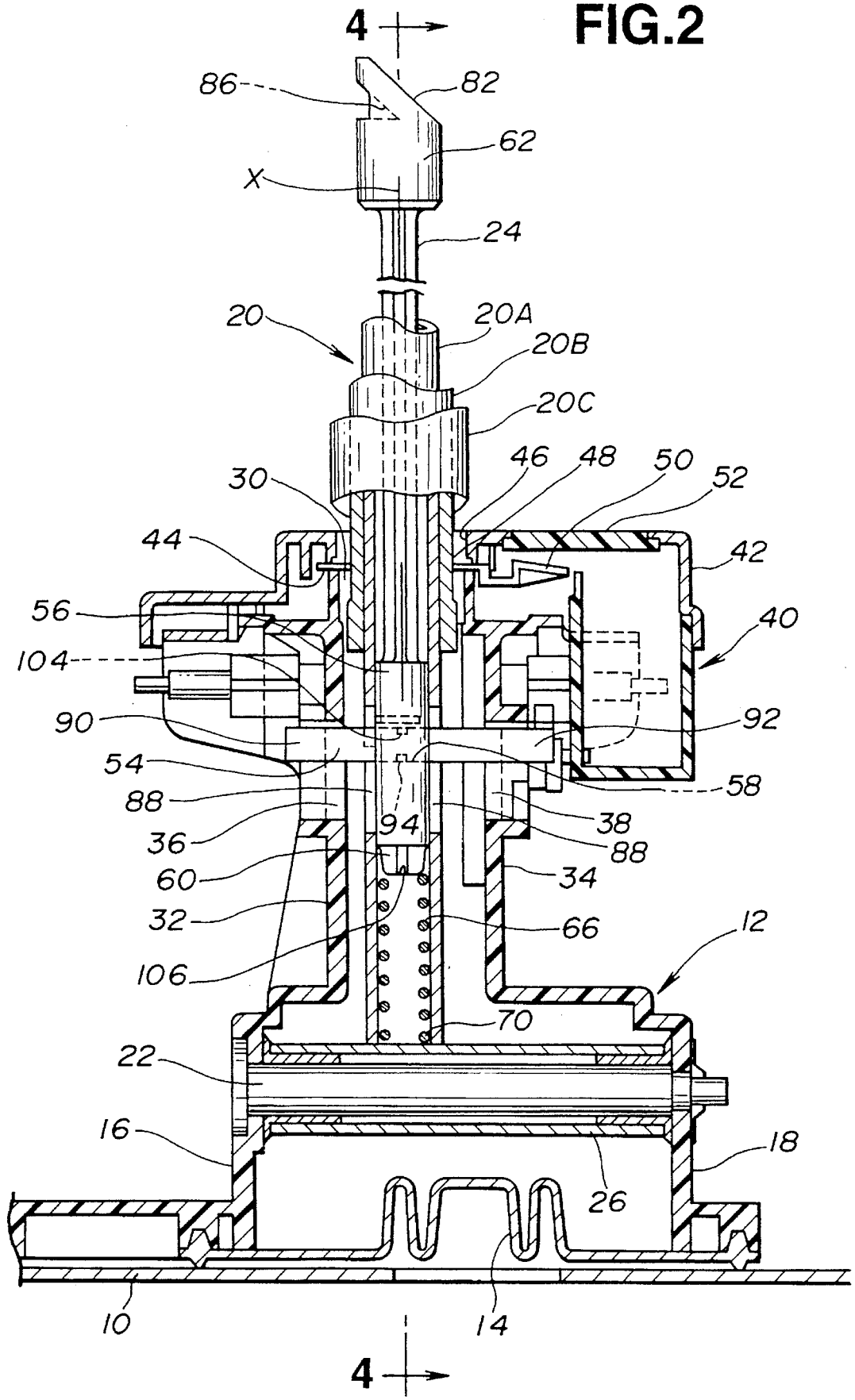
FIG. 2 is a front-sectional view of the shift ever assembly, taken in the longitudinal direction of the shift lever, but taken off a knob shown in FIG. 1.

Referring now to FIGS. 1 and 2, a shift lever assembly according to a first embodiment of the invention now is explained.

As illustrated in FIGS. 1 and 2, the shift lever assembly includes a housing 12. The housing 12 is secured to a vehicle floor 10 through a boot 14, as shown in FIG. 2. The housing 12 is formed by a resin molding and has opposing side walls 16 and 18. A shift lever 20 is pivotably supported on a shaft 22 secured to the opposing side walls 16 and 18 of the housing 12. The shift lever 20 is hollowed to receive a detent rod 24 for its movement in a longitudinal direction of the shift ever 20. Specifically, the shift lever 20 includes a tubular body 20A, an inner cylindrical frame 20B receiving the tubular body 20A, and an outer cylindrical frame 20C receiving the inner cylindrical frame 20B together with the tubular body 20A. The tubular body 20A has one end secured to a sleeve 26 rotatably mounted on the shaft 22 through an intermediate member such as bushing. The inner and outer frames 20B and 20C extend longitudinally outwardly from substantially a mid-portion to an opposite end of the tubular body 20A and fixed to the tubular body 20A by fastening members 28, as shown in FIG. 1. Thus, the shift lever 20 as a whole is allowed to move pivotally with respect to the shaft 22.

The shift lever 20 extends longitudinally outwardly through an opening 30 of the housing 12 which is defined between upper portions, as viewed in FIG. 2, of the side walls 16 and 18. The side walls 16 and 18 act as position plates 32 and 34 formed with detent cam profiles 36 and 38, respectively. The detent cam profiles 36 and 38 are so contoured as to have steps or edges for the gear positions. FIG. 1 shows only the detent cam profile 36 formed on the position plate 32 but it would be appreciated that the detent cam profile 38 with the same corresponding steps or edges is disposed on the opposing position plate 34. An indicator box 40 is secured to upper portions as viewed in FIG. 2, of the position plates 32 and 34. The indicator box 40 includes a cover 42 and a slide plate 44 arranged inside the cover 42.

The cover 42 and the slide plate 44 are formed with apertures 46 and 48, respectively, in substantially aligned relation to the opening 30. The shift lever 20 projects outwardly through the opening 80 and the apertures 46 and 48. An indicator 50 is provided at one end of the slide plate 44 to be opposed to a gear-position panel 52 fixed in the cover 42. The indicator 50 moves together with the shift lever 20 and aligns with one of gear-position marks disposed on the gear-position panel 52 to indicate the corresponding gear position which is at present selected by a vehicle operator.

The detent rod 24 is of a cylindrical shape and made of a suitable material such as metal, for instance, iron, and synthetic resin. The detent rod 24 has an axis X and carries a lateral detent pin 54 disposed in transverse relation to the axis X, as shown in FIG. 2. The detent rod 24 includes a pin support portion 56 formed with a lateral through bore 58 receiving the lateral detent pin 54. The pin support portion 56 has an increased diameter. The detent rod 24 has one axial lower end as viewed in FIG. 2, formed with a spring retainer 60 and an opposite axial upper end as viewed in FIG. 2, formed with a cam member 62 contacted with a knob button 64 shown in FIG. 1. The spring retainer 60 is of a generally annular shape coaxial with the detent rod 24. A compression spring 66 has one end 68 bearing against the spring retainer 60 and an opposite end 70 mounted on the sleeve 26. The compression spring 66 is operative to apply force to the detent rod 24 in a direction toward the knob button 64.

Figure 3:
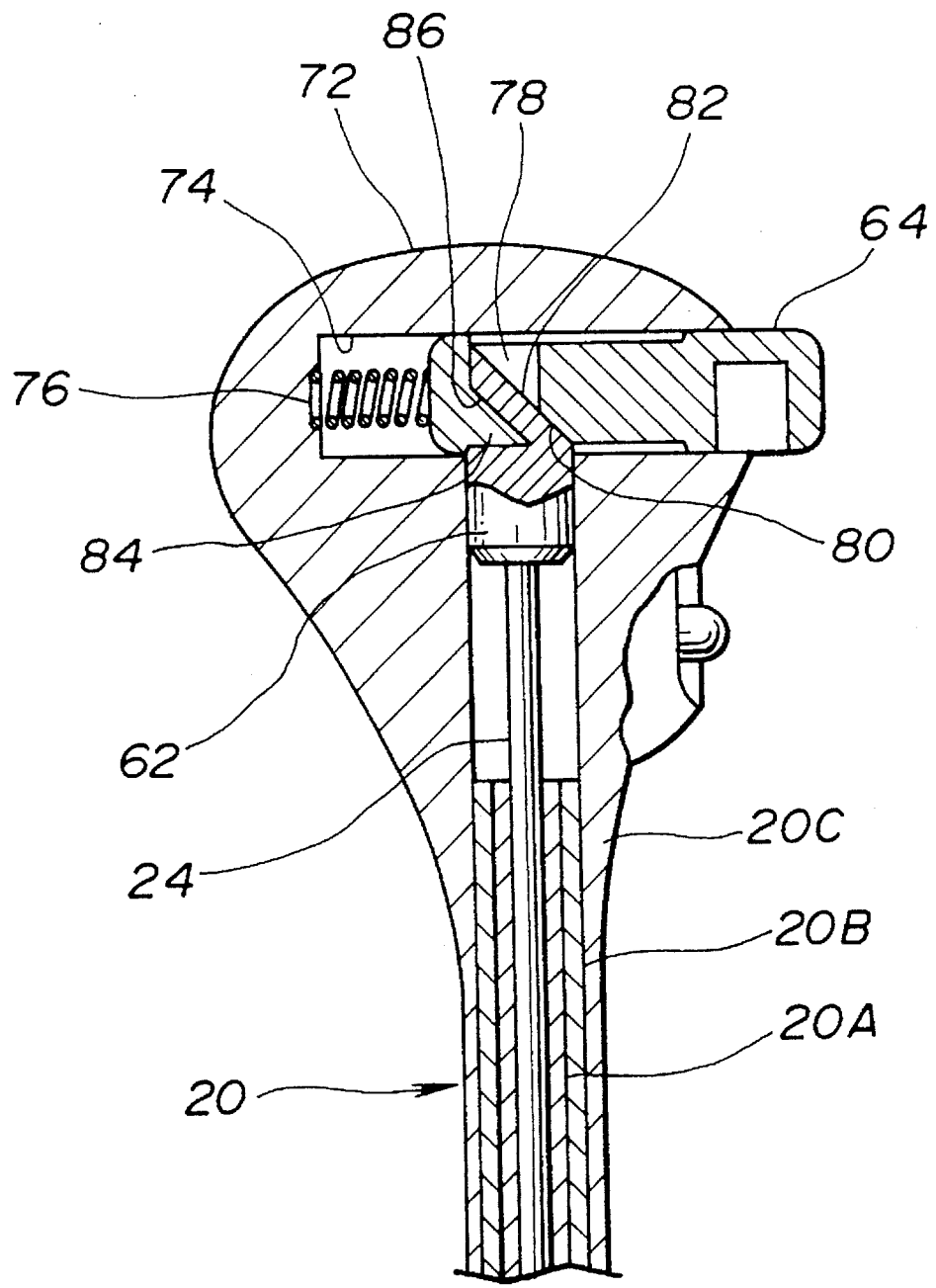
FIG. 3 is a fragmentary front-sectional view of the shift lever assembly, showing the knob attached to an upper end portion of the shift lever.

The detent rod 24 is so disposed as to be movable axially or in a longitudinal direction of the shift lever 20. For example, referring to FIG. 8, a mechanism for axially moving the detent rod 24 is now explained. As illustrated in FIG. 3, a knob 72 is formed integrally with the outer cylindrical frame 20C of the shift lever 20 to have a lateral hole 74 receiving the knob button 64. The knob button 64 is biased by a compression spring 76 mounted on a bottom of the lateral hole 74 in such a direction that a tip end of the knob button 64 projects out of the lateral hole 74. The knob button 64 has a recessed portion 78 receiving the cam member 62. The recessed portion 78 includes a slant face 80 contacted with a sloped cam face 82 of the cam member 62. The knob button 64 is formed with a tapered projection 84 in the recessed portion 78 which is engaged in a notch 86 of the cam member 62. When the knob button 64 is depressed against the compression spring 76 to move inward the lateral hole 74, the slant face 80 of the recessed portion 78 of the knob button 64 slides along the sloped cam face 82 of the cam member 62. This causes the cam member 62 to be urged to move downward as viewed in FIG. 3. Thus, the detent rod 24 is allowed to move downward as viewed in FIG. 3, in the longitudinal direction of the shift lever 20 and shift from its initial position shown in FIG. 3. Conversely, when the knob button 64 is released to move outward the lateral hole 74 by the biasing force of the compression spring 76, the slant face 80 slides back on the sloped cam face 82 and the cam member 62 is forced to move upward as viewed in FIG. 5 and return to the initial position. Thus, the detent rod 24 is allowed to move upward as viewed in FIG. 3, in the longitudinal direction of the shift lever 20.

During this movement of the detent rod 24, the lateral detent pin 54 moves along longitudinally extending guide slots 88 which are formed in the tubular body 20A in diametrically opposed relation to each other as shown in FIG. 2. The lateral detent pin 54 has opposing ends 90 and 92 projecting outward from the guide slots 88. The opposing ends 90 and 92 engage the detent cam profiles 36 and 38 of the position plates 32 and 34, respectively. This engagement allows the shift lever 20 to be placed in a position thereof corresponding to the gear position.

As illustrated in FIG. 4, the lateral detent pin 54 is of a generally rectangular shape in section. The lateral detent pin 54 is formed with a groove 94 positioned in the lateral through bore 58 when assembled into the lateral through bore 58, as shown in FIGS. 4 and 5. The groove 94 extends across the axis X of the detent rod 24 or transversely with respect to the longitudinal direction of the shift lever 20, and perpendicular to a longitudinal direction of the lateral detent pin 54 or lateral through bore 58. The detent rod 24 is formed with a generally cylindrical passage 96 extending axially in the pin support portion 56. The passage 96 has one end opening at the one axial end of the detent rod 24 and an opposite end opening to the lateral through bore 58. As shown in FIGS. 4 and 5, the passage 96 includes a lower cylindrical portion 96A communicated with a cavity of the spring retainer 60, an upper flat slit-shaped portion 96C communicated with the lateral through bore 58, and an intermediate frustoconical portion 96B interposed between the lower and upper portions 96A and 96C.

A lock bolt 98 is slidably received in the passage 96 and extends along the axis X of the detent rod 24. The lock bolt 98 has one end 100, viz. lower end as viewed in FIGS. 4 and 5, connected to the compression spring 66 at the one end 68 thereof and an opposite end 102, viz. upper end as viewed in FIGS. 4 and 5, engaged in the groove 94 of the lateral detent pin 54. In this embodiment, the lock bolt 98 is an integral part of the compression spring 66. The lock bolt 98 is in the form of an inversely U-shaped structure having a rounded bottom. The rounded bottom serves as the opposite end 102 of the lock bolt 98 which is engaged in the groove 94. The inversely U-shaped structure is formed from a wire constituting the compression spring 66. The lateral detent pin 54 is formed with a groove 104 which is positioned in the lateral through bore 58 in opposed relation to the groove 94 when assembled into the lateral through bore 58. By the provision of the opposed grooves 94 and 104, positioning of the lateral detent pin 54 for engagement with the opposite end 102 of the lock bolt 98 is easier or simpler than a case where the lateral detent pin 54 with only one groove is inserted. Thus, this arrangement of the opposed grooves 94 and 104 serves for improving assembling operation efficiency. At least one groove is used for engagement with the lock bolt 98 and therefore the opposite groove is dispensable.

Figure 6:
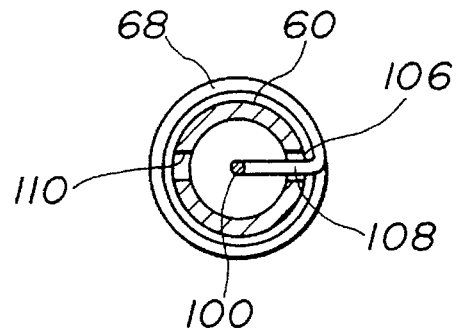
FIG. 6 is a cross-section, taken along the line 6—6 of FIG. 4.

As illustrated in FIG. 6, the spring retainer 60 is formed with a slot 106 receiving the one end 68 of the compression spring 66. Specifically, the one end 68 of the compression spring 66 includes a mount portion 108 extending radially inward with respect to the axis X. A slot 110 is formed on the spring retainer 60 in diametrically opposed relation to the slot 106 with respect to the axis X. The provision of the opposed slots 106 and 110 serves for increasing operation efficiency for mounting of the compression spring 66 onto the spring retainer 60. However, one of the opposed slots 106 and 110 may be omitted, if desired.

A manner of assembling operation of the lateral detent pin 54 on the detent rod 24 is described hereinafter.

First, the lock bolt 98 is inserted into the passage 96 so that the rounded bottom 102 of the lock bolt 98 is positioned in the lateral through bore 58 of the detent rod 24. Upon this insertion, the mount portion 108 of the compression spring 66 is received in the slot 106 of the spring retainer 60 and thus the one end 68 of the compression spring 66 is mounted on the spring retainer 60. Subsequently, the detent rod 24 with the lock bolt 98 and compression spring 66 is received in the tubular body 20A of the shift lever 20. The lateral detent pin 54 is inserted into the lateral through bore 58 through the guide slot 88 of the tubular body 20A until the rounded bottom 102 of the lock bolt 98 is engaged in the groove 94 of the lateral detent pin 54. Once the rounded bottom 102 is engaged in the groove 94, the lateral detent pin 54 is prevented from its movement in the lateral through bore 58 with respect to the detent rod 24. Thus, the shift lever assembly of the present invention is assembled by a simple and easy operation and achieves securely supporting of the lateral detent pin 54 on the detent rod 24 without a movement of the lateral detent pin 54 with respect to the detent rod 24.

Figure 7:
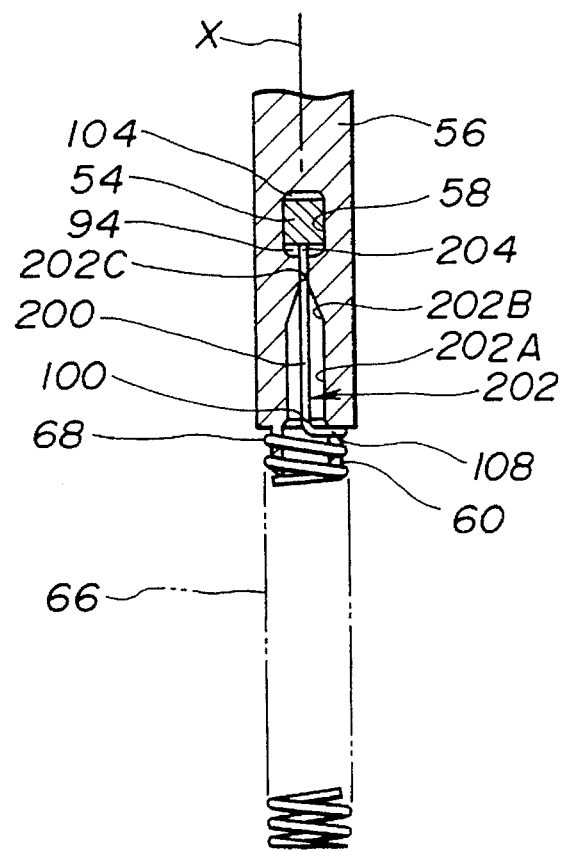
FIG. 7 is a fragmentary side-sectional view of a second embodiment of the shift lever assembly, taken in the longitudinal direction of the shift lever.

Referring to FIG. 7, a second embodiment according to the present invention will now be explained, which is similar to the first embodiment described above except a lock bolt 200 and a passage 202 which are substituted for the lock bolt 98 and the passage 96 of the first embodiment. Like reference numerals denote like parts and therefore detailed explanations thereabout are omitted.

As illustrated in FIG. 7, the lock bolt 200 is in the form of a straight bar shape having a straight distal end 204. The straight distal end 204 serves as an end off the lock bolt 200 which is engaged in the groove 94 of the lateral detent pin 54 and opposed to the one end 100 thereof. The passage 202 includes an increased-diameter portion 202A communicated with the cavity of the spring retainer 60, a reduced-diameter portion 202C communicated with the lateral through bore 58, and an intermediate frustum portion 202B interposed between the increased-diameter portion 202A and reduced-diameter portion 202C.

Figure 8:
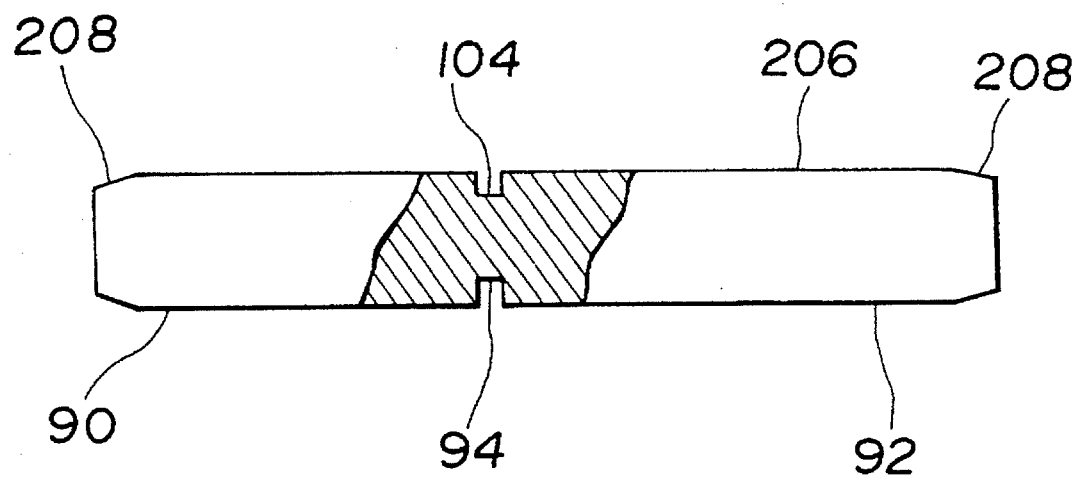
FIG. 8 shows a modified lateral detent pin for use in the shift lever assembly.

Referring to FIG. 8, a modified lateral detent pin 206 is explained. As illustrated in FIG. 8, the modified lateral detent pin 206 has a beveled portion 208 at a circumferential edge of each of the opposing ends 90 and 92 thereof. The provision of the beveled portion 208 serves for facilitating smooth and easy inserting operation of the lateral detent pin 206 into the lateral through bore 58.

What is claimed is:

1. A shift lever assembly, comprising:
   a detent rod with a lateral detent pin, said detent rod having one end and a lateral through bore receiving said lateral detent pin;
   a pivotable shift lever which is hollowed to receive said detent rod for movement in a longitudinal direction of the shift lever; and
   a compression spring having one end bearing against said one end of said detent rod and operative to apply force to said detent rod;
   wherein said detent pin is formed with a groove positioned in said lateral through bore, said detent rod being formed with a passage having one end opening at said one end of said detent rod and the opposite end opening to said lateral through bore, and a lock bolt is slidably received in said passage, said lock bolt having one end connected to said compression spring at said one end thereof and an opposite end engaged in said groove of said lateral detent pin.

2. A shift lever assembly as claimed in claim 1, wherein said lock bolt is an integral part of said compression spring.

3. A shift lever assembly as claimed in claim 2, wherein said lock bolt is in the form of an inversely U-shaped structure having a rounded bottom serving as said opposite end of said lock bolt.

4. A shift lever assembly as claimed in claim 3, wherein said inversely U-shaped structure is formed from a wire constituting said compression spring.

5. A shift lever assembly as claimed in claim 1, wherein said groove extends transversely with respect to the longitudinal direction of said shift lever and perpendicular to a longitudinal direction of said lateral detent pin.

6. A shift lever assembly as claimed in claim 5, wherein said lateral detent pin has a second groove in an opposed relation to said groove.

7. A shift lever assembly as claimed in claim 1, wherein said detent rod includes a spring retainer at said one end thereof, said spring retainer being formed with a first slot receiving said one end of said compression spring.

8. A shift lever assembly as claimed in claim 7, wherein said spring retainer is formed with a second slot diametrically opposed to said first slot.

9. A shift lever assembly as claimed in claim 2, wherein said lock bolt is in the form of a straight bar shape having a straight distal end serving as said opposite end of said lock bolt.

\* \* \* \* \*